US012000609B2

(12) United States Patent
Li et al.

(10) Patent No.: US 12,000,609 B2
(45) Date of Patent: Jun. 4, 2024

(54) DETECTING PRESENCE AND ESTIMATING THERMAL COMFORT OF ONE OR MORE HUMAN OCCUPANTS IN A BUILT SPACE IN REAL-TIME USING ONE OR MORE THERMOGRAPHIC CAMERAS AND ONE OR MORE RGB-D SENSORS

(71) Applicant: The Regents of the University of Michigan, Ann Arbor, MI (US)

(72) Inventors: Da Li, Clemson, SC (US); Carol C. Menassa, Ann Arbor, MI (US); Vineet Kamat, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 366 days.

(21) Appl. No.: 17/422,142

(22) PCT Filed: Jan. 9, 2020

(86) PCT No.: PCT/US2020/012882
§ 371 (c)(1),
(2) Date: Jul. 9, 2021

(87) PCT Pub. No.: WO2020/146596
PCT Pub. Date: Jul. 16, 2020

(65) Prior Publication Data
US 2022/0090811 A1 Mar. 24, 2022

Related U.S. Application Data

(60) Provisional application No. 62/790,526, filed on Jan. 10, 2019.

(51) Int. Cl.
*F24F 11/63* (2018.01)
*B60H 1/00* (2006.01)
(Continued)

(52) U.S. Cl.
CPC .......... *F24F 11/63* (2018.01); *B60H 1/00742* (2013.01); *G01J 5/0025* (2013.01);
(Continued)

(58) Field of Classification Search
CPC ......... F24F 11/63; F24F 2120/10; G06T 7/33; G06T 2207/10024; G06T 2207/10028;
(Continued)

(56) References Cited

U.S. PATENT DOCUMENTS 9,644,857 B1 * 5/2017 Ashgriz ................. G06T 19/00
11,015,832 B2 * 5/2021 Annaamalai ............ F24F 11/64
(Continued)

FOREIGN PATENT DOCUMENTS

EP          3396263 A1    10/2018
JP         H0532117 A      2/1993
(Continued)

OTHER PUBLICATIONS

Vidas, et al. "3D Thermal Mapping of Building Interiors using an RGB-D and Thermal Camera." 2013 IEEE International Conference on Robotics and Automation (ICRA) Karlsruhe, Germany, May 6-10, 2013. (Year: 2013).*
(Continued)

*Primary Examiner* — Kyle M Lotfi
(74) *Attorney, Agent, or Firm* — Reising Ethington P.C.

(57) ABSTRACT

A method of making a thermal comfort estimation of one or more human occupants in a built space in real-time is presented. The method employs one or more thermographic cameras and one or more red, green, and blue depth (RGB-D) sensors. The method has several steps. In an example, the method involves capturing thermal images of the human occupant(s) via the thermographic camera(s) and capturing RGB-D images of the human occupant(s) via the RGB-D camera(s). The method further involves extracting facial
(Continued)

skin temperatures of the human occupant(s) using the captured thermal images and using the captured RGB-D images. And the method involves estimating the thermal comfort of the human occupant(s) using the extracted facial skin temperatures.

19 Claims, 7 Drawing Sheets

(51) Int. Cl.
    *F24F 120/10* (2018.01)
    *G01J 5/00* (2022.01)
    *G06T 7/33* (2017.01)
    *G06V 40/10* (2022.01)
    *H04N 23/90* (2023.01)

(52) U.S. Cl.
    CPC ............... *G06T 7/33* (2017.01); *G06V 40/10* (2022.01); *H04N 23/90* (2023.01); *F24F 2120/10* (2018.01); *G06T 2207/10024* (2013.01); *G06T 2207/10028* (2013.01); *G06T 2207/10048* (2013.01); *G06T 2207/30201* (2013.01); *G06T 2207/30232* (2013.01)

(58) Field of Classification Search
    CPC . G06T 2207/10048; G06T 2207/30201; G06T 2207/30232; G06V 40/10; H04N 23/90; B60H 1/00742; G01J 5/0025
    See application file for complete search history.

(56) References Cited

U.S. PATENT DOCUMENTS

| | | | | |
|---|---|---|---|---|
| 2012/0019643 | A1* | 1/2012 | Gideon | G06Q 20/145 348/E7.087 |
| 2014/0346160 | A1 | 11/2014 | Moench et al. | |
| 2015/0233598 | A1 | 8/2015 | Shikii et al. | |
| 2017/0334263 | A1 | 11/2017 | Schumacher et al. | |
| 2018/0039845 | A1 | 2/2018 | Chen et al. | |
| 2018/0072133 | A1 | 3/2018 | Yamanaka et al. | |

FOREIGN PATENT DOCUMENTS

| | | |
|---|---|---|
| JP | H07243687 A | 9/1995 |
| JP | 2006317075 A | 11/2006 |
| JP | 20100159887 A | 7/2010 |
| JP | 5146819 B2 | 2/2013 |
| KR | 1020170078732 A | 7/2017 |

OTHER PUBLICATIONS

A. Ismail et al., "Relationship Between Thermal Comfort and Driving Performance Among Malaysian Bus Driver", ARPN Journal of Engineering and Applied Sciences, vol. 10, No. 17, Sep. 2015, 6 pages.

A. Marinescu et al., "Physiological Parameter Response to Variation of Mental Workload", Human Factors, vol. 60, No. 1, Feb. 2018, 26 pages.

"Thermal Imaging Detects Mental Strain on Pilots' Face", Centaur Communications LTD, Jan. 2018, 5 pages.

International Search Report corresponding to International Application No. PCT /US2020/012882, dated May 8, 2020, 3 pages.

Written Opinion corresponding to International Application No. PCT /US2020/012882, dated May 8, 2020, 3 pages.

Japanese Office Action for JP application No. 2021-540410 with English summary, dated Sep. 6, 2022, 4 pages.

European office action corresponding to application 20738027.0, dated Nov. 16, 2023, 7 pages.

Cardone D et al.: "Warping-based co-registration of thermal infrared images: Study of factors influencing its applicability", Infrared Physics and Technology, Elsevier Science, GB, vol. 83, May 4, 2017 (May 4, 2017), pp. 142-155.

Faye E et al.: "Distance makes the difference in thermography for ecological studies", Journal of Thermal Biology, Pergamon Press, Oxford, GB, vol. 56, Dec. 17, 2015 (Dec. 17, 2015), pp. 1-9.

* cited by examiner

DETECTING PRESENCE AND ESTIMATING THERMAL COMFORT OF ONE OR MORE HUMAN OCCUPANTS IN A BUILT SPACE IN REAL-TIME USING ONE OR MORE THERMOGRAPHIC CAMERAS AND ONE OR MORE RGB-D SENSORS

STATEMENT CONCERNING FEDERALLY SPONSORED RESEARCH

One or more inventions set forth herein were made with Government support under Grant Nos. 1407908, 1349921, and 1804321 awarded by the National Science Foundation (NSF). The Government may have certain rights in one or more of the inventions.

TECHNICAL FIELD

This disclosure relates to assessments of thermal comfort of individuals in various built spaces and, more particularly relates to assessing thermal comforts for the purpose of controlling heating, ventilation, and air conditioning (HVAC) systems in the built spaces.

BACKGROUND

A person's thermal comfort influences their health and well-being. Thermally uncomfortable environments—i.e., too warm, too cool—have been shown to decrease productivity for occupants in office workplace settings, decrease concentration for operators of transportation vehicles, and even contribute to a condition known as "sick building syndrome," among other drawbacks. Moreover, some estimations show that buildings consume around forty percent (40%) of the energy produced globally, and that heating, ventilation, and air conditioning (HVAC) systems account for the largest amount of energy consumption in buildings.

Assessing a person's thermal comfort is a challenge. To begin with, thermal comfort is oftentimes more subjective than objective—a thermal condition that is too cool for one person may feel just right for another. And, thermal sensations and preferences tend to evolve over time in a particular setting; for instance, an air-conditioned room in summer may initially feel comfortable, but then later feel too cool as one's body steadily loses heat. Further, a person's thermal comfort is commonly swayed by physiological (e.g., gender, body mass index), psychological (e.g., expectation, stress), and behavioral (e.g., clothing, activity level) factors. Previous efforts to assess thermal comfort have involved what-is-often observed as intrusive means of data collection. The means have included requiring continuous human feedback via a phone-based or web-based application or some other way, and have included devices such as sensors that are placed in direct contact with a person's body, among other efforts. Some of these means have proven unreliable and impractical, and some lack the scalability and flexibility needed for widespread non-experimental implementation.

SUMMARY

According to one aspect of the disclosure, a method of making a thermal comfort estimation of one or more human occupants in a built space in real-time employs the use of one or more thermographic cameras and one or more red, green, and blue depth (RGB-D) sensors. The method may have several steps. The method may involve providing the thermographic camera(s) at the built space, and providing the RGB-D sensor(s) at the built space. The method may further involve capturing thermal images of the human occupant(s) in the built space by way of the thermographic camera(s), and capturing RGB-D images of the human occupant(s) in the built space by way of the RGB-D sensor(s). The method may also involve extracting facial skin temperatures of the human occupant(s) using the captured thermal images and the captured RGB-D images. Extracting facial skin temperatures may involve registering the captured thermal images and the captured RGB-D images. And the method may involve estimating the thermal comfort of the human occupant(s) in the built space using the extracted facial skin temperatures of the human occupant(s).

According to another aspect of the disclosure, a method of making a thermal comfort estimation of one or more human occupants in a built space in real-time employs the use done or more thermographic cameras and one or more red, green, and blue depth (RGB-D) sensors. The method may have several steps. The method may involve capturing thermal images of the human occupant(s) in the built space by way of the thermographic camera(s) from various distances and various angles, and capturing RGB-D images of the human occupant(s) in the built space by way of the RGB-D sensor(s) from various distances and various angles. The various distances and various angles are of the human occupant(s) with respect to the thermographic camera(s) and RGB-D sensor(s). The method may also involve extracting facial skin temperatures of the human occupant(s) using the captured thermal images and the captured RGB-D images. Distance data provided from the RGB-D sensor(s) may be used with temperature data provided from the thermographic camera(s) in the extracting step. And the method may involve estimating the thermal comfort of the human occupant(s) in the built space using the extracted facial skin temperatures of the human occupant(s).

According to yet another aspect of the disclosure, a method of making a thermal comfort estimation or one or more human occupants in a built space in real-time employs the use of one or more thermographic cameras and one or more red, green, and blue depth (RGB-D) sensors. The method may have several steps. The method may involve capturing thermal images of the human occupants) in the built space by way of the thermographic camera(s), and capturing RGB-D images of the human occupant(s) in the built space by way of the RGB-D sensor(s). The method may also involve extracting facial skin temperatures of the human occupant(s) using the captured thermal images and the captured RGB-D images. The extracting step may further invoke locating coordinates in the captured RGB-D images onto the captured thermal images. The method may involve estimating the thermal comfort of the human occupant(s) in the built space using the extracted facial skin temperatures of the human occupant(s). And the method may involve controlling heating, ventilation, and air conditioning (HVAC) of the built space based upon the estimated thermal comfort of the human occupant(s).

BRIEF DESCRIPTION OF THE DRAWINGS

Exemplary embodiments will hereinafter be described in conjunction with the appended drawings, wherein like designations denote like elements, and wherein.

DETAILED DESCRIPTION

Figure 1:
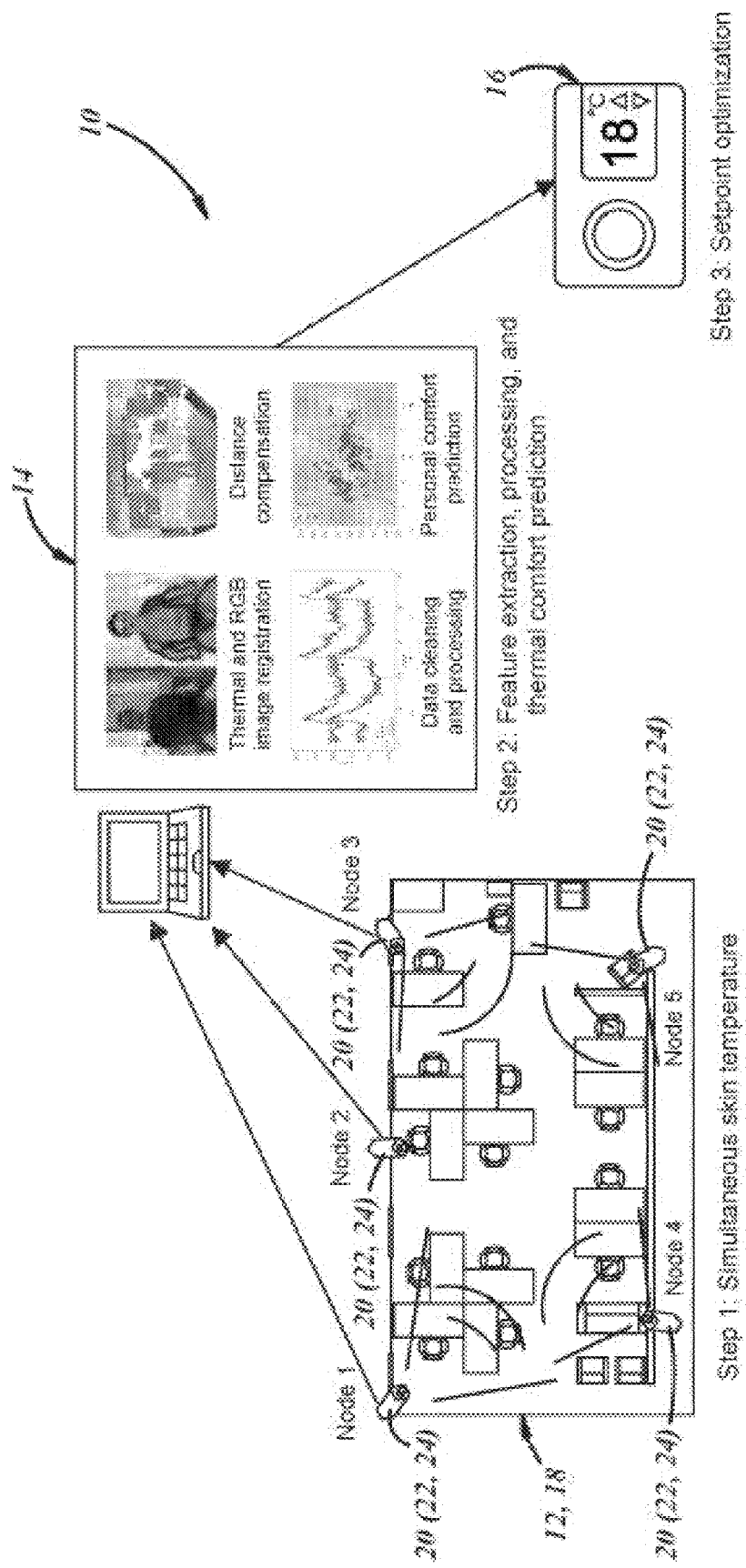
FIG. 1 is a schematic of an embodiment of a method of making a thermal comfort estimation and subsequent control of a heating, ventilation, and air conditioning (HVAC) system.

In several example embodiments, a method of making a thermal comfort estimation of one or more human occupants in a built space in real-time is detailed in this description. The method involves multiple steps and employs the use of a network of one or more thermographic cameras and one or more red, green, and blue depth (RGB-D) sensors to a synergistic end. Compared to previous efforts of assessing thermal comfort, the method detailed herein estimates thermal comfort continuously and in a non-intrusive manner, and without purposeful human feedback and without devices that come in direct contact with an individual's body. The method can simultaneously estimate thermal comfort of multiple occupants exhibiting various postures and engaging in various movements in a built space, resulting in arbitrary and different distances and angles among the individuals and the thermographic camera(s) and RGB-D sensor(s). Unlike the more passive approaches of previous efforts, the method detailed herein is an automated, data-driven, and user-centric approach. Furthermore, the method is designed and constructed with scalability and flexibility so that it can be readily implemented in non-experimental built spaces and settings. Once the method estimates thermal comfort, the heating, ventilation, and air conditioning (HVAC) directed to the built space can be controlled based in part or more upon the estimations in order to ultimately improve thermal comfort for the occupant(s) and minimize energy consumption by the HVAC system.

As used herein, the term "built space" has an expansive meaning. The term refers to indoor spaces such as rooms and halls and other areas found in residences, commercial buildings, workplace offices and conference rooms, hospitals and nursing homes, and classrooms, among other examples. Moreover, a built space is also a space within a transportation vehicle such as a passenger compartment in an automobile, a cockpit in an airplane, and a passenger-carrying area in a train. Still, the term "built space" can refer to other spaces in other environments and other vehicles.

The method of making thermal comfort estimations of the human occupant(s) in the built space can vary in different embodiments depending upon, among other possible factors, the particular built space that the method is intended for and the particular network of thermographic cameras and RGB-D sensors employed. It will become apparent to skilled artisans as this description advances that the method can have more, less, and/or different steps than those set forth with reference to the figures. One example of the method (reference numeral 10) is presented in FIG. 1. In this embodiment, the method of making thermal comfort estimations of the human occupant(s) in the built space involves i) providing the thermographic camera(s) and the RGB-D sensor(s) (reference numeral 12), ii) capturing thermal images of the human occupant(s) via the thermographic camera(s) and capturing RGB-D images of the human occupant(s) via the RGB-D sensor(s) (12); iii) extracting facial skin temperatures of the human occupant(s) through use of the captured thermal images and the captured RGB-D images (reference numeral 14); iv) estimating the thermal comfort of the human occupant(s) through use of the extracted facial skin temperatures (14); and v) controlling the HVAC of the built space based in part or more upon the estimated thermal comfort (reference numeral 16).

The thermographic camera(s) is utilized for temperature measurements and temperature data in the method. The thermographic camera(s) continuously captures thermal images of the human occupant(s) in the built space. The thermographic camera(s) provided can be of various types and can possess various specifications. In an example, the thermographic camera(s) is a radiometric longwave infrared (LWIR) camera such as the Lepton® 2.5 model thermal camera, a product of FLIR Systems, Inc of Wilsonville. Oregon U.S.A.—this is a relatively lower cost thermographic camera and is suitable for use in the method described herein. The specifications of this example thermal camera include: dimensions of 8.5×11.7×5.6 mm, resolution of 80 (h)×60 (v) pixels, thermal sensitivity of <50 mK, accuracy of ±5° C. or ±5% of reading in the working range, and field of view (FOV) of 51° (h) and 42° (v). Still, other types of thermographic cameras may be suitable, and other specifications for the thermographic camera(s) may be suitable. In the method, the RGB-D sensor(s) is utilized for human detection via its RGB camera functionality, feature detection via its RGB camera functionality, and distance data via its depth sensor functionality. The RGB-D sensor(s) continuously captures RGB-D images of the human occupant(s) in the built space. Like the thermographic camera(s), the RGB-D sensor(s) provided can be of various types and can possess various specifications. In an example, the RGB-D sensor(s) is a Kinect™ RGB-D camera, a product of Microsoft Corporation of Redmond, Washington U.S.A. The specifications or this example RGB-D camera include a resolution of 640 (h)·480 (v) pixels, a FOV of 57° (h) and 43° (v), an effective depth sensor range of 0.8-5.0 m, and a depth accuracy of ±4 cm at the maximum working range (5.0 m). Still, other types of RGB-D sensors may be suitable, and other specifications for the RGB-D sensor(s) may be suitable. It has been determined that the functionalities of the thermographic camera(s) and the RGB-D sensor(s) complement each other and enhance the overall effectiveness of the disclosed method. As subsequently described, the RGB-D sensor(s) assists the thermographic camera(s) with detection and location of human faces for extracting facial skin temperatures; distance data from the RGB-D sensor(s) is also used to account for the impact of distance on the temperature measurements of the thermographic camera(s). The RGB-D sensor(s) possesses a higher resolution than that of the thermographic camera(s), and RGB-D images generally contain more color data than thermal images and hence are more suitable for more advanced detection algorithms.

The thermographic cameras(s) and RGB-D sensor(s) together make a network of cameras and sensors. Depending on the particular built space, the method of making thermal comfort estimations of the human occupant(s) can have a single thermographic camera along with a single RGB-D sensor, or can have multiple thermographic cameras, each paired with one RGB-D sensor. The precise quantity of thermographic cameras and RGB-D sensors in a particular built space can be dictated in at least some instances by the size of the built space and the number, locations, poses, and movements of expected occupants. An example of a built space in which a single thermographic camera along with a single RGB-D sensor may suffice is a semi-trailer truck passenger compartment and an airplane cockpit; of course, these spaces could be outfitted with multiple thermographic cameras and RGB-D sensors. FIG. 1 presents an example of a built space 18 having multiple thermographic cameras and RGB-D sensors. The built space 18 in this example is modeled after a workplace office in which numerous occupants can remain sitting at various locations with various postures, while other occupants can move about in various ways. Five camera nodes 20 are positioned at different sites in the built space 18 so that the accompanying thermographic cameras and RGB-D sensors exhibit a field of view that covers and observes all areas in the built space 18 for capturing images of all occupants from various distances and angles, however many occupants there are in the built space 18. Each camera node 20 includes a single thermographic camera 22 and a single RGB-D sensor 24 that are paired together as a unit. The unit is rigidly mounted at its site in the built space 18.

Figure 2:
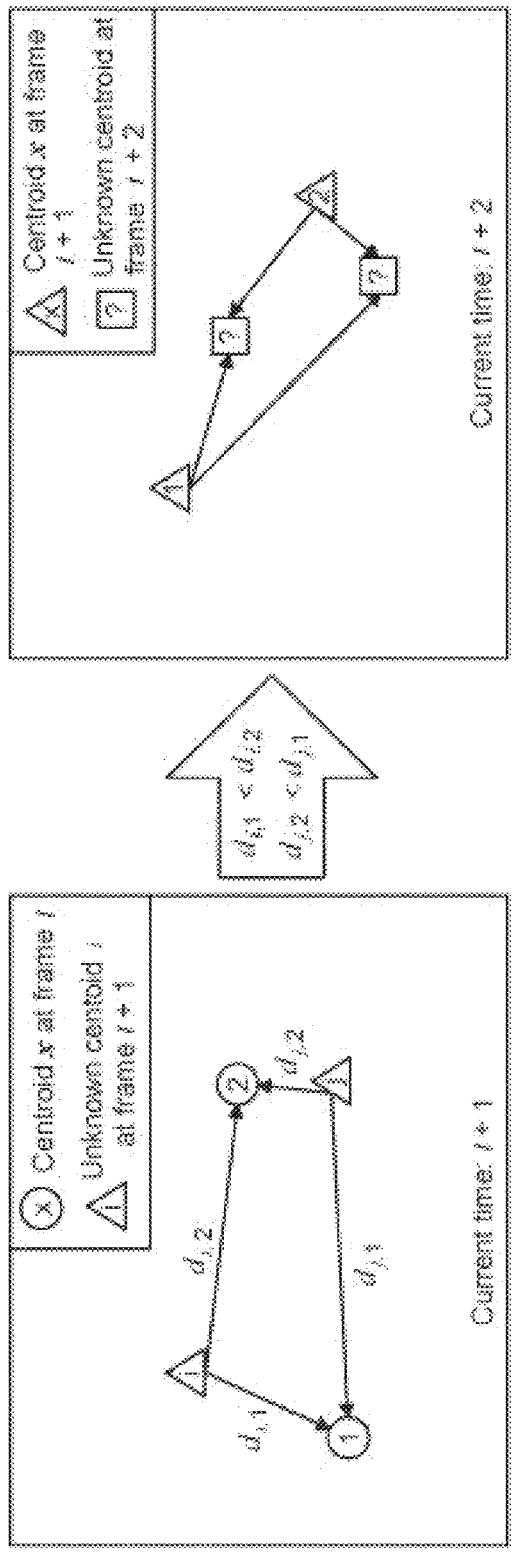
FIG. 2 is a schematic representation of a centroid tracking algorithm.

In an embodiment of the method of making thermal comfort estimations, a single camera node 20 composed of a single thermographic camera 22 and a single RGB-D sensor 24 can distinguish individual and separate occupants among many occupants in the built space 18, and can track the movement of each of the occupants. In an example, a centroid tracking algorithm is employed for this purpose; still, other means may be employed in other embodiments. The centroid tracking algorithm initially detects a centroid of each face of each occupant in a current captured image frame—this can be carried out via a deep neural network (DNN) face detection module found in the library of Open Source Computer Vision (OpenCV 3.3), for example; still, other means of distinguishing occupants and tracing their movements may be used in other embodiments. In an example of two occupants in the built space 18, at time t+1 the centroid tracking algorithm calculates the Euclidean distance between each pair of face centroids in two consecutive image frames at time t and t+1, and then updates an occupant ID in image frame t+1 by the closest face centroid in image frame t.

$$\text{Occupant } ID = \underset{m \in M_t}{\operatorname{argmin}} \|x_{t+1} - m\|$$

where $M_t$ is a set of face centroids of all occupants in the built space 18 at time t; m is one face centroid in the set $M_t$, $x_{t+1}$ is a face centroid of a particular occupant at time t+1 (which needs to be updated), and $\|\cdot\|$ is the L2-norm. The centroid tracking algorithm is presented schematically in FIG. 2.

In an embodiment of the method of making thermal comfort estimations, the total number of the human occupant(s) can be determined and counted in the built space 18 via the thermographic camera(s) 22. This determination can be carried out in various ways and with various steps. In an example the determination and counting involves processing thermal images captured by the thermographic camera(s) 22 using morphological operations. The determination and counting can further involve locating the human occupant(s) in the morphological-transformed thermal images using blob detection methodology.

Figure 3:
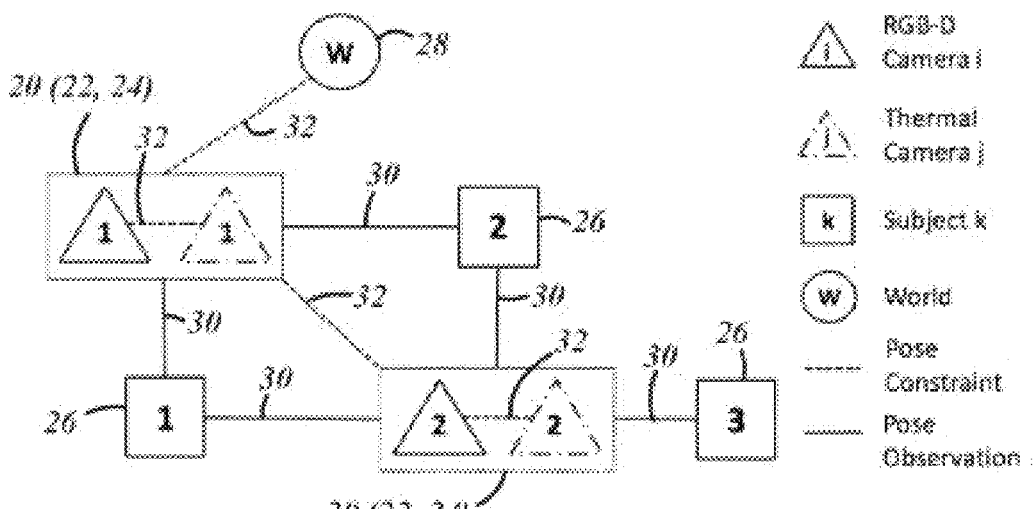
FIG. 3 is a graph abstraction representation of an example network of camera nodes and occupants.

The network of thermographic cameras 22 and RGB-D sensors 24 can have different designs in different built spaces 18, according to different embodiments of the method disclosed herein. The network can be depicted in a graph abstraction representation consisting of nodes and edges. FIG. 3 presents an example network having three occupants 26 and two camera nodes 20. The graph abstraction representation of FIG. 3 has three types of nodes: (1) the camera node 20, (2) an occupant node (occupants 26), and (3) a world coordinate node 28 which denotes the origin in the three-dimensional world. The edges connecting the nodes include observations 30 and constraints 32. An observation 30 represents the pose between a particular camera node 20 and occupant node 26. The observation 30 can vary as an occupant 26 alters their posture and moves about in the built space 18. The observations 30 can then be calculated using a pinhole camera model that is subsequently set forth in this description. The constraints 32 represent known and predetermined geometric relationships. The constraints 32 residing within each camera node 20 denote the relative pose between the thermographic camera 22 and RGB-D sensor 24 of the particular camera node 20. The sole constraint 32 spanning between the distinct camera nodes 20 in FIG. 3 denotes the relative pose between those two camera nodes 20 according to their mounted sites in the built space 18. These constraints 32 can be determined amid the initial design work of the network of thermographic cameras 22 and RGB-D sensors 24 in the built space 18, and are unaffected by the number, locations, poses, and movements of the occupants 26 in the built space 18. Furthermore, the one constraint 32 spanning between the one camera node 20 and the world coordinate node 28 can also be determined amid the initial design work of the network since the position of the camera node 20 at the mounted site is known.

In an embodiment, the step of extracting facial skin temperatures of the human occupant(s) in the method involves detecting a face of the human occupant(s) via the RGB-D sensor(s). The human face has been found to be an ideal region of interest for temperature extraction due to its high density of blood vessels and because it is generally not covered by clothing like other areas of a human's body. The DNN face detection module of the OpenCV 3.3 library has been found suitable for detecting human faces; still, other means of face detection and other algorithms may be used in other embodiments.

Furthermore, in an embodiment, the step of extracting facial skin temperatures of the human occupant(s) in the method involves registering captured thermal images and captured RGB-D images so that coordinates of the detected face of the RGB-D images can be mapped and located on the thermal images. In an example, the pinhole camera model is employed for this purpose; still, other means may be employed in other embodiments. In the pinhole camera model, the three-dimensional world coordinates are projected into two-dimensional image coordinates via the perspective transformation (equation 100):

$$s\begin{bmatrix}u\\v\\1\end{bmatrix}=\begin{bmatrix}f_x & 0 & c_x\\0 & f_y & c_y\\0 & 0 & 1\end{bmatrix}\begin{bmatrix}r_{11} & r_{12} & r_{22} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$

In a more concise form, the equation 100 reads:

$$sm=K[R|T]M$$

where M is a 4×1 vector representing a homogeneous coordinate of a three-dimensional point in the three-dimensional world coordinate space: m is a 3×1 vector representing a homogeneous coordinate of a two-dimensional point in the image coordinate; K is the 3×3 intrinsic matrix of the camera consisting of the focal lengths ($f_x$, $f_y$) and principal points ($C_x$, $C_y$); [R|T] is the 3×4 extrinsic matrix consisting of a rotation R and a translation T; and s is a scaling factor.

Figure 4:
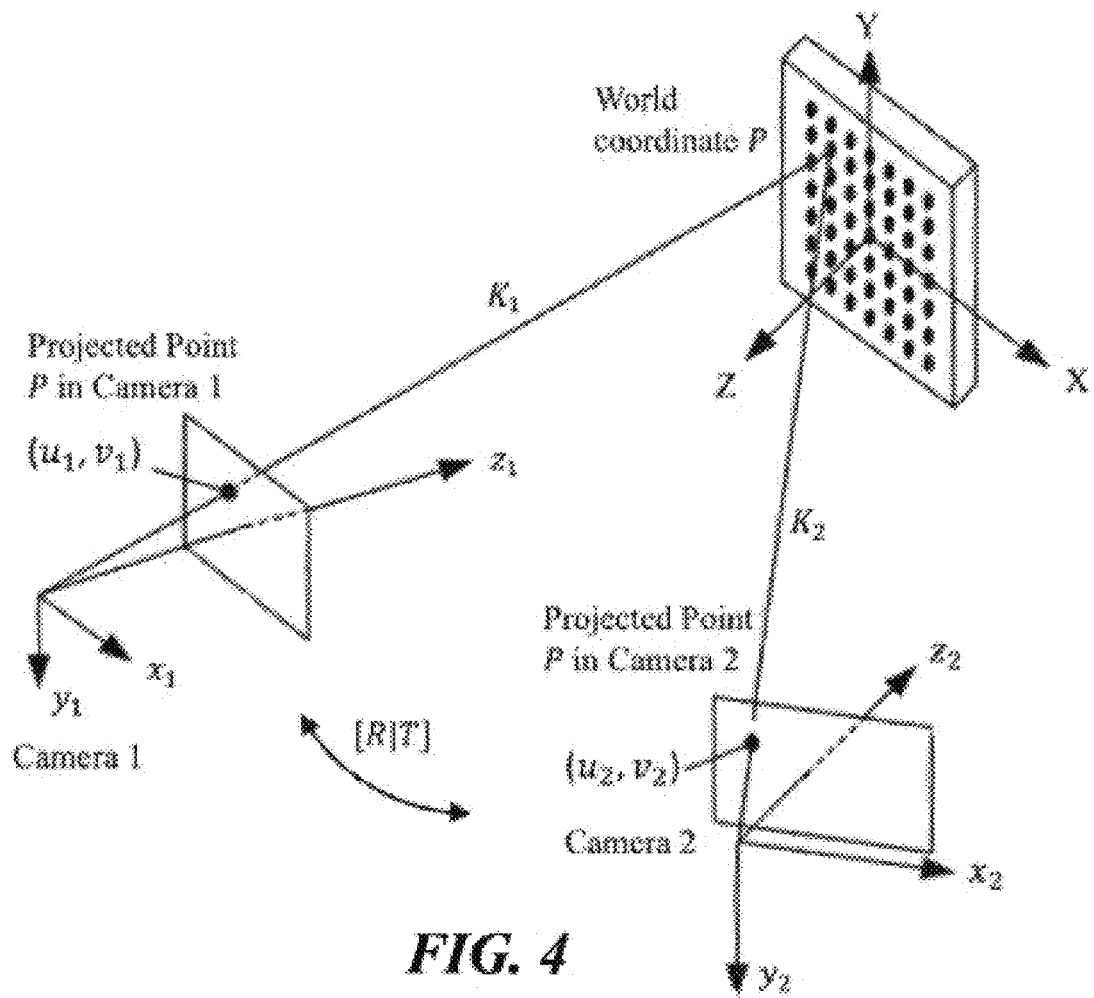
FIG. 4 is a schematic representation of a stereo vision calibration process.

In the camera node 20 with the single thermographic camera 22 and single RGB-D sensor 24, calibration for registration involves estimating the intrinsic matrix of the thermal camera $K_{IR}$, the intrinsic matrix of the RGB camera $K_{RGB}$ of the RGB-D sensor 24, and the homogeneous transformation matrix [R|T] between the thermographic camera 22 and RGB camera. Once these estimations are made, point correspondences in the two cameras can be determined via the pinhole camera model of the equation 100 in practice, calibration of the camera node 20 can be carried out with a stereo vision calibration process such as that available in MATLAB by MathWorks®; still, other means may be employed in other embodiments. In general, the stereo vision calibration process involves the thermographic camera 22 and the RGB-D sensor 24 observing a planar and pre-defined pattern—such as a checkerboard or square grid pattern—from two or more different orientations in order to determine any unknowns using a maximum likelihood estimation method, as an example. The schematic of FIG. 4 demonstrates the stereo vision calibration process.

Figure 5:
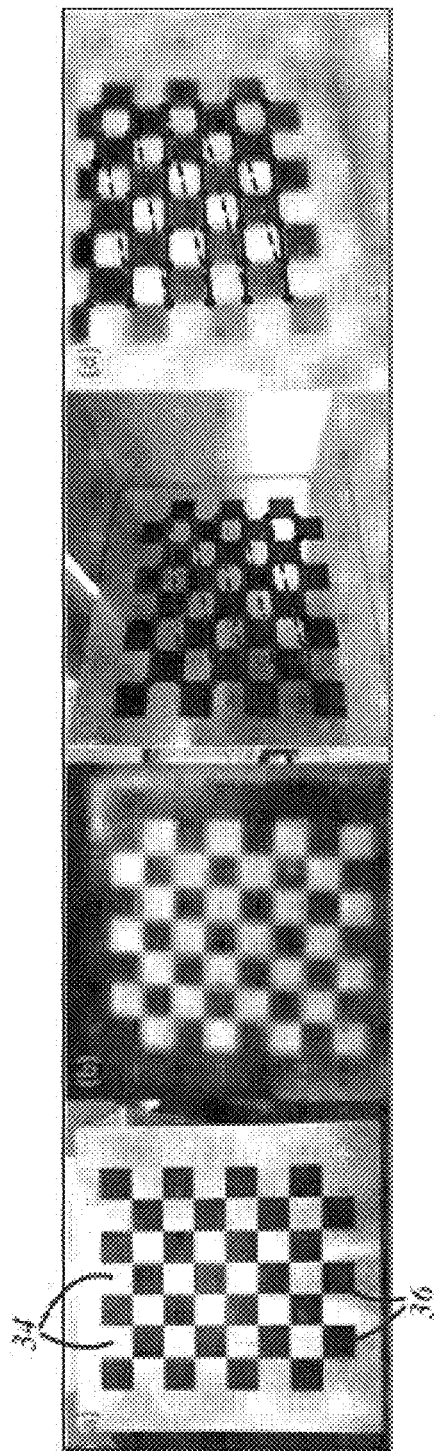
FIG. 5 depicts several views of a checkerboard pattern that can be used in the stereo vision calibration process.
Figure 6:
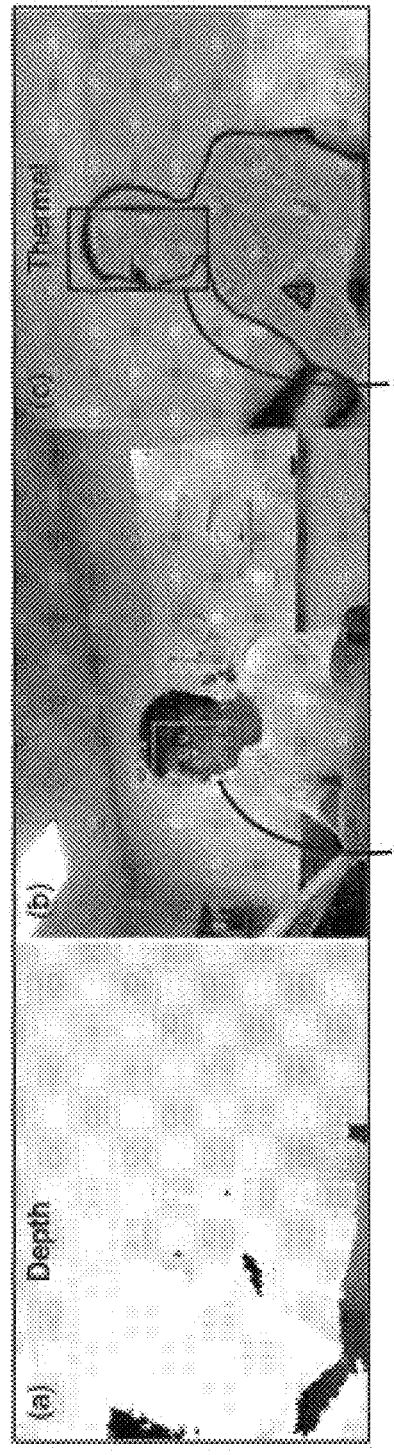
FIG. 6 depicts views of a captured RGB-D image and a captured thermal image from a single camera node.

Since the thermographic camera 22 may be unable to observe and capture some black and white patterns for such calibration purposes as infrared energy emitted across the patterns remains the same, a 6·7 checkerboard pattern of aluminum foil and vinyl polymer was prepared. FIG. 5 depicts the checkerboard pattern prepared, with aluminum foil squares 34 shown in silver and vinyl polymer squares 36 shown in black. View (a) is a photograph of the checkerboard pattern. Due to the contrasting colors, images of the checkerboard pattern of FIG. 5 can be captured and detected by the RGB-D sensor 24 in order to extract corner points in the pattern—view (c) depicts this. For thermal imaging, the aluminum foil squares 34 possess a higher emissivity than the vinyl polymer squares 36 and hence emit greater infrared energy. As a result, the aluminum foil squares 34 appear brighter than the vinyl polymer squares 36 in a captured thermal image when the checkerboard pattern is heated—view (b) of FIG. 5 depicts this. Further, as shown in view (d), corner points in the checkerboard pattern can be observed by the thermographic camera 22. Once calibrated, coordinates of the detected face and distance data in the captured RGB-D images can be mapped and located onto the captured thermal images. FIG. 6 depicts this in different views taken from a single camera node, view (a) presents depth/distance data from the RGB-D sensor 24, view (b) presents captured RGB-D images from the RGB-D sensor 24 with a bounding box 38 confining the facial region of the subject occupant, and view (c) presents captured thermal images from the thermographic camera 22 with a mapped bounding box 40 confining the facial region of the subject occupant.

Figure 7:
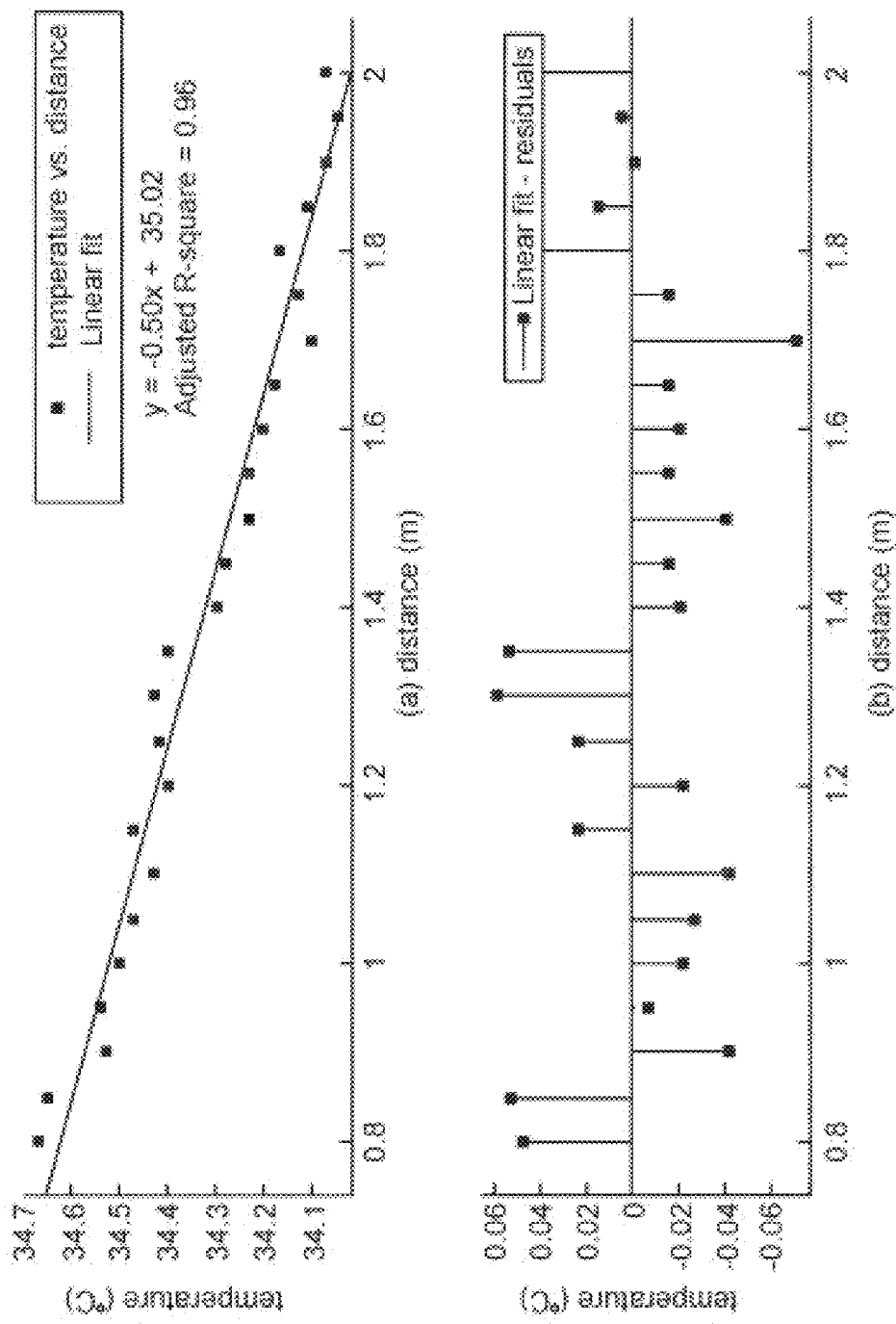
FIG. 7 is a pair of graphs presenting results of a study of facial skin temperature collection at different distances, with distance in meters (m) plotted on the x-axes and temperature in Celsius (° C.) plotted on the y-axes.

It has been found that the infrared energy emitted by an object, such as a human face, and that ultimately is captured by the thermographic camera 22 can be impacted by the distance between the object and the thermographic camera 22. Hence, distance data measured between the thermographic camera 22 and the human face(s) of the occupant(s) in the particular built space can be used, in an embodiment, to account for this impact on infrared energy emission in the step of extracting facial skin temperatures of the method. In an example with multiple thermographic cameras 22, the distance data taken between each thermographic camera 22 and each human face can be used as described herein. For calibration purposes to account for the distance data, a study was conducted in which a thermographic camera collected a subject's mean facial skin temperature at distances from 0.8 meters (m) to 2.0 m with a step size of 0.05 m. In the study, room temperature was 26° C. and relative humidity was 28.5%. The distance data was provided by the Kinect™ RGB-D camera, which has been shown to have a depth measurement accuracy of ±4 centimeters (cm) in a working range of 5 m. The distance data was collected within a timeframe of one minute, and therefore the facial skin temperature of the particular subject was assumed to be constant amid that timeframe. Three samples were collected at each distance and averaged to represent the facial skirt temperature measurement at the particular distance. FIG. 7 presents the results of the study in graph form. In graph (a), a linear relationship is evident from the samples ($\hat{y}$=−0.50x+35.02, adjusted R-square=0.96), implying that facial skin temperature measurements can be decreased by 0.5° C. for every one meter increase in distance for the thermographic camera employed in the study. Graph (b) shows the residual plots of the linear fit. Here, it can be observed that the residual plots are somewhat symmetrically distributed around zero and that no clear patterns emerge, indicating a good lit of the linear model. Skilled artisans will appreciate that other similar studies can yield other results.

In an embodiment of the method of making thermal comfort estimations, multiple camera nodes 20 (again, each composed of a single thermographic camera 22 and a single RGB-D sensor 24) can associate multiple captured thermal profiles of multiple occupants 26 with the correct occupant in the three-dimensional world. This is referred to as occupant registration. With reference again to FIG. 3, in an example, the camera node 20 numbered one (1) in the figure observes and captures only two of three occupants 26, while the camera node 20 numbered two (2) in the figure observes and captures all three of these three occupants 26. Here, the method can associate the two thermal profiles of the occupants 26 in the camera node 20 numbered two (2) with the two corresponding and correct occupants 26 in the camera node 20 numbered one (1). It has been found that certain feature-based methods for carrying out occupant registration in examples such as this may not be suitable in all embodiments of the method, since feature points in the camera nodes one (1) and two (2) can differ somewhat substantially (e.g., camera node one (1) captures front of face while earners node two (2) captures side profile of face), and because calculating feature descriptors can be computationally intensive for real-time implementation. As a consequence, in an embodiment, occupant registration based on location and via the pinhole camera model of the equation 100 and the stereo vision calibration process can be performed. For purposes of occupant registration, however, in lieu of calibrating the thermographic camera 22 and RGB-D sensor 24, each pair of RGB-D cameras (of RGB-D sensors 24) can be calibrated to arrive at the homogeneous transformation matrix [R|T]. This calibration can be effected with a paper primed checkerboard pattern, for instance. Then, the three-dimensional world coordinate $[X\ Y\ Z\ 1]^T$ of each occupant 26 with respect to the world coordinate node 28 can be determined from the equation 100. Lastly, in this embodiment, the occupant ID in the camera node i can be mapped and located to those from a different viewpoint j based on the closest distance with an equation 200.

$$\text{Occupant } ID = \underset{m \in M_j}{\arg\min} \|x_1 - m\|$$

where $M_j$ is a set of three-dimensional world coordinates of all occupants in the camera node j; m is one three-dimensional world coordinate in the set $M_j$; $x_i$ is the three-dimensional world coordinate of a particular occupant in the camera node i (subject to registration); $\|\cdot\|$ the L2-norm. Accordingly, in this way a camera network can recursively register the same occupants 26 in different camera nodes 20.

Furthermore, for communications among distinct camera nodes 20, the User Datagram Protocol (UDP) data communications protocol can be implemented in an embodiment of the method of making thermal comfort estimations. The exchanged communications can include the three-dimensional world coordinates of the occupants 26 for occupant registration purposes.

In an embodiment, the step of extracting facial skin temperatures of the human occupant(s) in the method can involve extracting skin temperatures from one or more regions of interest. The regions of interest can include areas of the human face such as the forehead, nose, cheeks, mouth, ears, and/or neck. Temperature measurements from the thermographic camera(s) 22 of each pixel located within a particular region of interest can be averaged to serve as a representation of the skin temperature of that particular region of interest. For increased accuracy, in an embodiment, pixel temperature measurement values that exceed certain thresholds (e.g., less than 28° C. or greater than 38° C.) can be filtered out and removed from each region of interest. Such values, it has been determined, are likely to be merely the background or noise, and can consequently interfere with facial skin temperature measurements. For example, a nearby light bulb could be included in the skin temperature measurements of a particular region of interest and, if not filtered out and removed, its higher measured temperature could result in a less accurate estimation that the accompanying occupant is warmer than he/she actually is in this embodiment, a total of twenty-six facial skin temperature measurements can be extracted including the maximum facial skin temperature measurement taken of the human face and its gradient, and the maxima, minima, mean, and gradient temperature of each region of interest (i.e., forehead, nose, cheeks, mouth, ears, and neck). For the gradient temperature, the mean gradient over a five minute period can be determined with equations 300 and 400 (presented in this order):

$$\nabla T_i = \frac{(T_c - T_{c-i})}{i}, i = \{1, 2, 3, 4, 5\}$$

$$\overline{\nabla T} = \frac{1}{5} \sum_{i=1}^{5} \nabla T_i$$

where $\nabla T_i$ is the gradient temperature for time interval i; $T_c$ is the temperature measurement at time c, $\overline{\nabla T}$ is the mean gradient temperature over five minutes which was selected as a feature.

In another embodiment, as an alternative to extracting temperatures from the region(s) of interest set forth above, the step of extracting facial skin temperatures of the human occupant(s) in the method can involve extracting skin temperatures from the whole human face. The whole human face, in this example, includes the front of the face as well as the side profile of the face. This embodiment may be more suitable in implementations in which thermal images of the smaller region(s) of interest may be more challenging to capture. In this alternative embodiment, extracting skirt temperatures from the whole human face can include: (i) the highest, lowest, mean, and quartiles (first, second, third) temperature measurements of all pixels in the detected facial region (these temperature measurements denote the overall distribution of facial skin temperature across the detected facial region); (ii) the skin temperature variances of all pixels in the detected facial region (it has been found that the nose, ears, and cheeks have larger skin temperature variations than the other regions of interest and hence a large skin temperature variation across the detected facial region can serve as an indication that the occupants) is experiencing cold stress); and (iii) the gradient temperature over every one minute period from the equations 300 and 400 (it has been found that the gradient temperature can serve as an indication of heat/cold stress).

Moreover, in the embodiments of extracting facial skin temperatures, if certain regions or portions of the human face are undetectable, the omitted temperature data can be imputed based upon other detectable regions or portions of the human face and/or past observations using methods such as the inverse probability weighting imputation technique.

Figure 8:
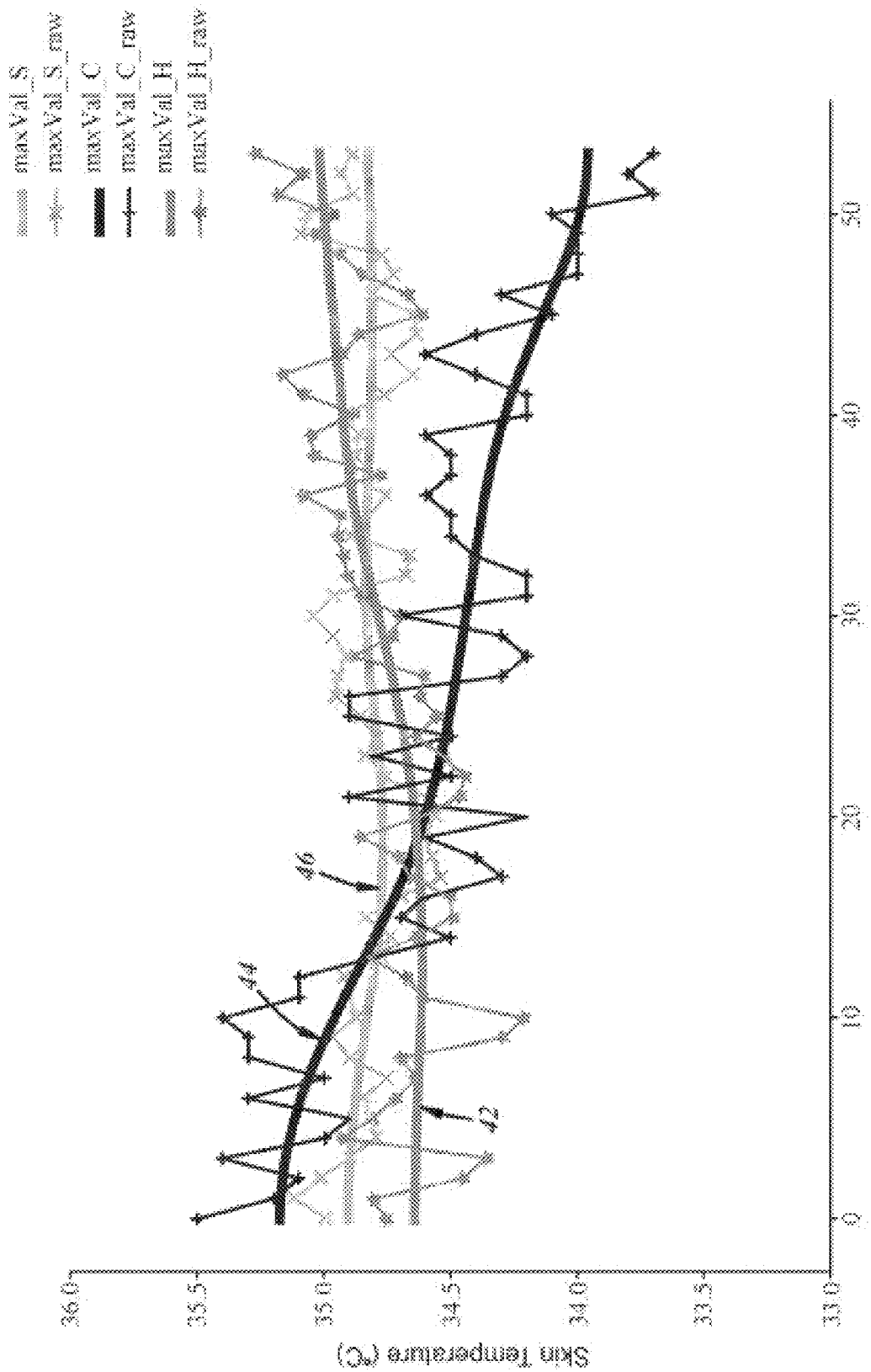
FIG. 8 is a graph presenting experimental results of an occupant's maximum facial skin temperatures in heating, cooling, and steady-state phases, with tittle in minutes plotted on the x-axis and facial skin temperature in Celsius (° C.) plotted on the y-axis.

In an embodiment of the method of making thermal comfort estimations, the temperature data can be subject to cleaning and smoothing to rid the data of potential errors. The errors may stem from sources including: (1) random experiment error that can vary among observations (e.g., hands situated adjacent the occupant's mouth amid drinking water could correspond to a spike in data); and (2) random measurement error of the thermographic camera 22 which can be assumed to follow a Gaussian distribution with a zero mean. To resolve these errors, in an embodiment, the captured thermal image frames can be averaged in each minute and outliers removed by checking the difference of adjacent measurements using equation 500:

$$d_i = \begin{cases} \text{outlier,} & \text{if } d_i - d_{i-1} \geq 3\sigma \\ \text{not an outlier,} & \text{otherwise} \end{cases}$$

where $d_i$ and $d_{i-1}$ are the temperature data collected at time i and i−1, and σ is the standard deviation of temperature data collected from time 0 to time i. Once the outliers are removed, a Gaussian filter can be applied to smooth the raw temperature data. FIG. 8 is a graph presenting experimental results of an occupant's maximum facial skin temperatures in a heating phase 42, a cooling phase 44, and a steady-state phase 46. The broken/dashed lines in the graph represent the raw temperature data collected directly from the thermographic camera utilized in the experiment, while the thicker solid lines (denoted by reference numerals 42, 44, 46) represent the processed temperature data after removing outliers and smoothing. By way of data processing, larger measurement errors can be removed prior to applying further analysis, resulting in a smoothed curve. Moreover, it can be observed front the graph of FIG. 8 the increasing trend of facial skin temperature in the heating phase 42, the decreasing trend of facial skin temperature in the cooling phase 44, and the relatively stable trend of facial skin temperature in the steady-state phase 46. Skilled artisans will appreciate that other similar experiments can yield other results. The environment conditions of the heating phase 42, cooling phase 44, and steady-state phase 46 are summarized in Table 1.

|  | Cooling | | | Hearing | | | Steady-State | | |
| --- | --- | --- | --- | --- | --- | --- | --- | --- | --- |
|  | Range | Mean | S.D. | Range | Mean | S.D. | Range | Mean | S.D. |
| T (° C.) | 27.5-22.6 | 25.1 | 1.4 | 22.5-27.7 | 25.3 | 1.5 | 24.5-25.2 | 24.8 | 0.2 |
| RH (%) | 20.2-33.4 | 27.7 | 3.6 | 32.5-21.4 | 25.8 | 2.2 | 20.6-26.5 | 23.2 | 0.5 |

Figure 9:
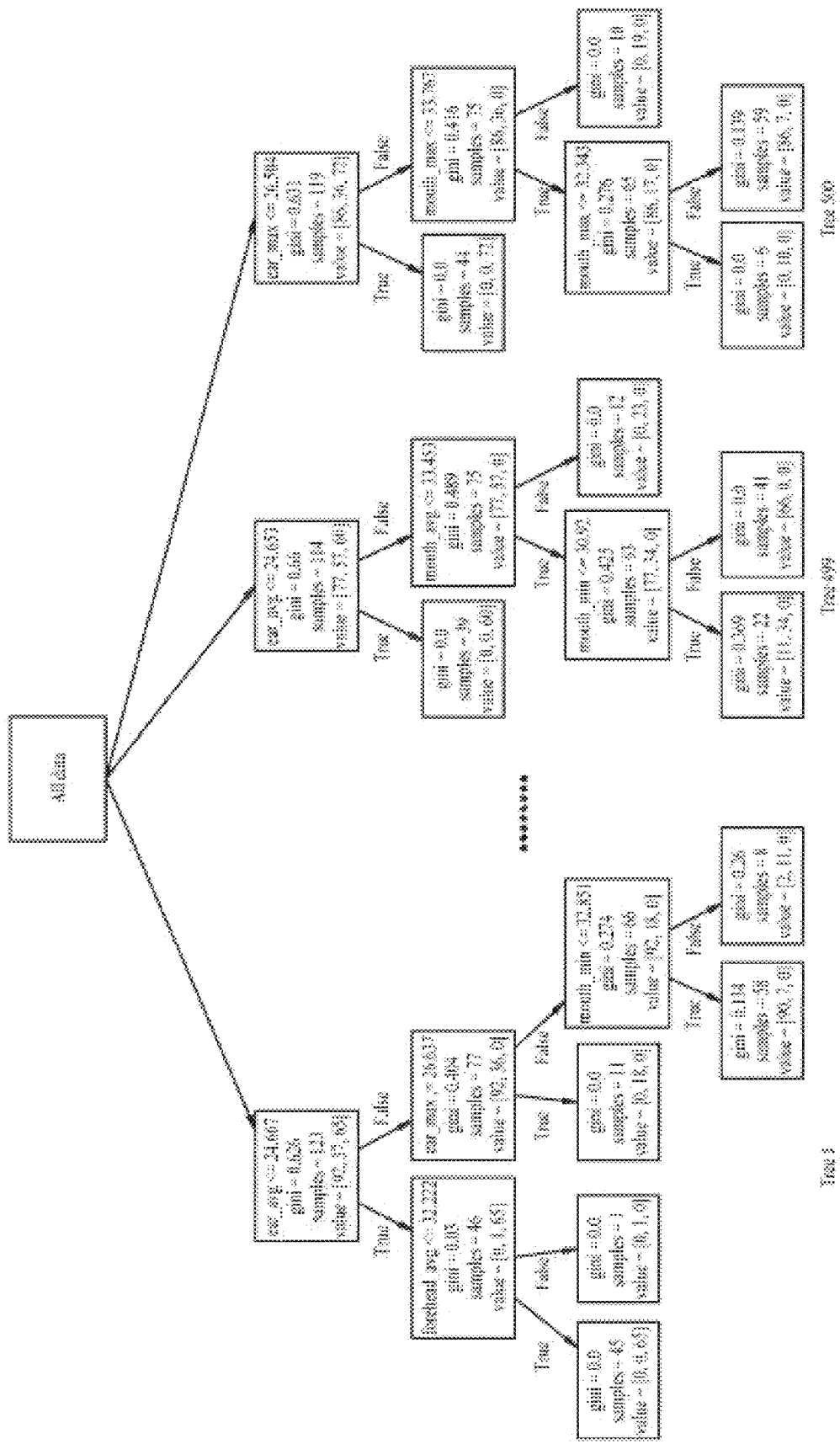
FIG. 9 is a random forest structure of the personalized comfort prediction model for an example occupant.

The step of estimating the thermal comfort of the human occupant(s) uses the extracted facial skin temperatures and can be carried out in different ways in different embodiments lit an embodiment, thermal comfort preference prediction, or estimation, can be translated into a classification problem in which the occupant(s)'s preference has three categorical values: warmer, cooler and neutral. Here, a comfort prediction model can be formulated as $TC = (T_{facial} \nabla_{facial})$, where TC is the targeted variable thermal comfort, and $(T_{facial} \nabla_{facial})$ are the facial skin temperature features extracted from each facial region and the corresponding gradients. Methods for classifying thermal comfort include machine learning methods such as support vector machine classification tree, and random forest. In this embodiment, the random forest method is employed. In general, the random forest method is an ensemble method that classifies an object by averaging a large collection of decision trees. The method applies aggregating and can reduce the overfitting problem introduced from decision trees. As previously noted, in an example a total of twenty-six features were considered for model training purposes. The random forest method, it has been found, is an ideal method to randomly sample the twenty-six training features at each split in order to reduce the variances in the training data. Further, in this embodiment, comfort prediction models were trained on each occupant's facial skin temperature dataset in order to develop personalized models. The random forest model was trained using the scikit-learn machine learning library of the Python programming language. Hyper-parameters were toned through the grid search to evaluate the accuracy of each configuration for performance optimization (i.e., 'n_estimators': [300, 500, 700, 1000], 'max_features': ['auto', 'sqrt', 'log 2'], 'max_depth': [2, 3, 4, 5]). The maximum number of features allowed in the estimators and the maximum tree depth were controlled at a smaller size to reduce the issue of overfitting. FIG. 9 depicts an example random forest structure with 500 classification trees for an occupant. In the example, each tree is allowed to have a maximum depth of 3 and up to 5 features.

The optimal hyper-parameters for each occupant's personalized comfort prediction model are presented in Table 2.

| Subject ID | Cooling | Heating | General |
| --- | --- | --- | --- |
| 1 | n_estimators: 300<br>max_depth: 2<br>max_features: auto | n_estimators: 500<br>max_depth: 2<br>max_features: auto | n_estimators: 300<br>max_depth: 2<br>max_features: auto |
| 2 | n_estimators: 500<br>max_depth: 2<br>max_features: sqrt | n_estimators: 300<br>max_depth: 2<br>max_features: sqrt | n_estimators: 1000<br>max_depth: 2<br>max_features: auto |
| 3 | n_estimators: 300<br>max_depth: 4<br>max_features: log2 | n_estimators: 300<br>max_depth: 2<br>max_features: auto | n_estimators: 500<br>max_depth: 2<br>max_features: auto |
| 4 | n_estimators: 300<br>max_depth: 2<br>max_features: auto | n_estimators: 300<br>max_depth: 2<br>max_features: auto | n_estimators: 1000<br>max_depth: 3<br>max_features: log2 |
| 5 | n_estimators: 300<br>max_depth: 2<br>max_features: auto | n_estimators: 300<br>max_depth: 2<br>max_features: log2 | n_estimators: 300<br>max_depth: 3<br>max_features: log2 |

-continued

| Subject ID | Cooling | Heating | General |
| --- | --- | --- | --- |
| 6 | n_estimators: 300<br>max_depth: 2<br>max_features: auto | n_estimators: 300<br>max_depth: 2<br>max_features: auto | n_estimators: 500<br>max_depth: 3<br>max_features: sqrt |
| 7 | n_estimators: 300<br>max_depth: 2<br>max_features: auto | n_estimators: 500<br>max_depth: 2<br>max_features: auto | n_estimators: 700<br>max_depth: 2<br>max_features: log2 |
| 8 | n_estimators: 300<br>max_depth: 2<br>max_features: auto | n_estimators: 300<br>max_depth: 2<br>max_features: auto | n_estimators: 700<br>max_depth: 5<br>max_features: log2 |
| 9 | n_estimators: 300<br>max_depth: 2<br>max_features: auto | n_estimators: 700<br>max_depth: 2<br>max_features: auto | n_estimators: 300<br>max_depth: 5<br>max_features: log2 |
| 10 | n_estimators: 300<br>max_depth: 2<br>max_features: auto | n_estimators: 300<br>max_depth: 2<br>max_features: auto | n_estimators: 700<br>max_depth: 3<br>max_features: log2 |
| 11 | n_estimators: 300<br>max_depth: 2<br>max_features: auto | n_estimators: 300<br>max_depth: 2<br>max_features: auto | n_estimators: 700<br>max_depth: 3<br>max_features: sqrt |
| 12 | n_estimators: 500<br>max_depth: 3<br>max_features: log2 | n_estimators: 500<br>max_depth: 3<br>max_features: log2 | n_estimators: 500<br>max_depth: 3<br>max_features: auto |

For each occupant (i.e., subject), three prediction models were evaluated—models for the cooling phase (designated "Cooling" in Table 2), developed with the temperature data collected in the cooling phase; models for the heating phase (designated "Heating" in Table 2), developed with the temperature data collected in the heating phase; and general models (designated "General" in Table 2), developed with temperature data from all three phases. Models for the steady-state phase were not developed, as occupants' thermal preferences generally did not change throughout that phase.

After tuning the hyper-parameters, ten-fold cross validations were conducted to evaluate the prediction accuracy of the comfort prediction models. The prediction accuracy of each occupant's personalized comfort prediction model is presented in Table 3:

| Subject ID | 1 | 2 | 3 | 4 | 5 | 6 | 7 | 8 | 9 | 10 | 11 | 12 | Avg. |
|---|---|---|---|---|---|---|---|---|---|---|---|---|---|
| Cooling | 0.935 | 0.825 | 0.875 | 0.921 | 0.935 | 0.947 | 0.921 | 0.946 | 0.942 | 0.921 | 0.943 | 0.882 | 0.916 |
| Heating | 0.916 | 0.840 | 0.932 | 0.946 | 0.955 | 0.955 | 0.942 | 0.933 | 0.933 | 0.952 | 0.942 | 0.873 | 0.927 |
| General | 0.730 | 0.801 | 0.829 | 0.921 | 0.900 | 0.878 | 0.859 | 0.854 | 0.830 | 0.885 | 0.906 | 0.812 | 0.850 |

On average, by using the selected facial skin temperature features, the personalized methods can achieve an 85.0% accuracy in predicting occupants' thermal comfort preferences and a higher accuracy of 91.6% and 92.7% in the cooling and heating phases.

In the example presented of this embodiment, in order to identify the most suitable features for thermal comfort prediction, the selected facial skin temperature features were ranked according to their contributions to minimizing the loss function. The five most suitable features for each occupant are presented in Table 4:

| Subject ID | Cooling | Heating | General |
|---|---|---|---|
| 1 | 'ear_avg' | 'ear_max' | 'cheek_min' |
|  | 'ear_max' | 'cheek_max' | 'nose_avg' |
|  | 'nose_avg' | 'nose_avg' | 'nose_max' |
|  | 'forehead_min' | 'forehead_avg' | 'ear_max' |
|  | 'ear_min' | 'cheek_min' | 'ear_avg' |
| 2 | 'forehead_min' | 'ear_max' | 'cheek_max' |
|  | 'forehead_avg' | 'mouth_min' | 'cheek_avg' |
|  | 'nose_min' | 'cheek_max' | 'ear_max' |
|  | 'neck_max' | 'neck_min' | 'forehead_min' |
|  | 'cheek_max' | 'mouth_avg' | 'nose_max' |
| 3 | 'cheek_max' | 'Vforehead' | 'ear_avg' |
|  | 'ear_max' | 'ear_max' | 'ear_min' |
|  | 'nose_min' | 'cheek_max' | 'ear_max' |
|  | 'nose_max' | 'ear_avg' | 'forehead_avg' |
|  | 'nose_avg' | 'nose_min' | 'neck_avg' |
| 4 | 'mouth_min' | 'ear_max' | 'ear_max' |
|  | 'mouth_avg' | 'cheek_max' | 'cheek_min' |
|  | 'cheek_max' | 'neck_min' | 'forehead_min' |
|  | 'ear_max' | 'cheek_avg' | 'ear_min' |
|  | 'nose_avg' | 'ear_avg' | 'ear_avg' |
| 5 | 'ear_max' | 'cheek_max' | 'maxVal' |
|  | 'nose_min' | 'ear_max' | 'forehead_avg' |
|  | 'forehead_min' | 'nose_avg' | 'forehead_max' |
|  | 'nose_avg' | 'nose_max' | 'cheek_min' |
|  | 'mouth_avg' | 'neck_avg' | 'neck_avg' |
| 6 | 'ear_max' | 'ear_max' | 'ear_avg' |
|  | 'cheek_max' | 'nose_avg' | 'ear_max' |
|  | 'nose_max' | 'cheek_avg' | 'cheek_avg' |
|  | 'mouth_avg' | 'ear_avg' | 'cheek_max' |
|  | 'mouth_min' | 'nose_max' | 'mouth_max' |
| 7 | 'nose_avg' | 'ear_max' | 'ear_max' |
|  | 'nose_min' | 'nose_avg' | 'mouth_avg' |
|  | 'ear_min' | 'nose_max' | 'forehead_avg' |
|  | 'forehead_min' | 'ear_avg' | 'mouth_min' |
|  | 'mouth_avg' | 'cheek_min' | 'neck_avg' |
| 8 | 'nose_max' | 'cheek_max' | 'nose_avg' |
|  | 'nose_avg' | 'neck_min' | 'ear_avg' |
|  | 'forehead_min' | 'ear_avg' | 'neck_max' |
|  | 'forehead_avg' | 'ear_min' | 'nose_min' |
|  | 'ear_avg' | 'neck_max' | 'ear_min' |
| 9 | 'forehead_min' | 'ear_max' | 'nose_max' |
|  | 'forehead_avg' | 'Vneck' | 'nose_min' |
|  | 'Vneck' | 'forehead_avg' | 'nose_avg' |
|  | 'maxVal' | 'cheek_avg' | 'forehead_min' |
|  | 'neck_max' | 'ear_avg' | 'Vneck' |
| 10 | 'cheek_max' | 'ear_avg' | 'nouth_max' |
|  | 'mouth_min' | 'cheek_min' | 'nose_max' |
|  | 'ear_max' | 'ear_min' | 'mouth_avg' |
|  | 'nose_min' | 'Vear' | 'mouth_min' |
|  | 'nose_avg' | 'mouth_min' | 'cheek_max' |
| 11 | 'forehead_min' | 'cheek_max' | 'nose_max' |
|  | 'nose_max' | 'ear_max' | 'forehead_avg' |
|  | 'Vear' | 'nose_avg' | 'neck_max' |
|  | 'forehead_avg' | 'neck_min' | 'forehead_min' |
|  | 'maxVal' | 'mouth_avg' | 'Vear' |
| 12 | 'nose_avg' | 'ear_avg' | 'nose_avg' |
|  | 'cheek_avg' | 'forehead_avg' | 'forehead_avg' |
|  | 'forehead_avg' | 'ear_max' | 'nose_max' |
|  | 'ear_max' | 'mouth_avg' | 'ear_avg' |
|  | 'cheek_min' | 'forehead_max' | 'cheek_avg' |

It can be observed that the suitable features are occupant-dependent. Moreover, the features are data-driven and may vary and evolve as more temperature data is collected in different environments and spaces over time.

Figure 10:
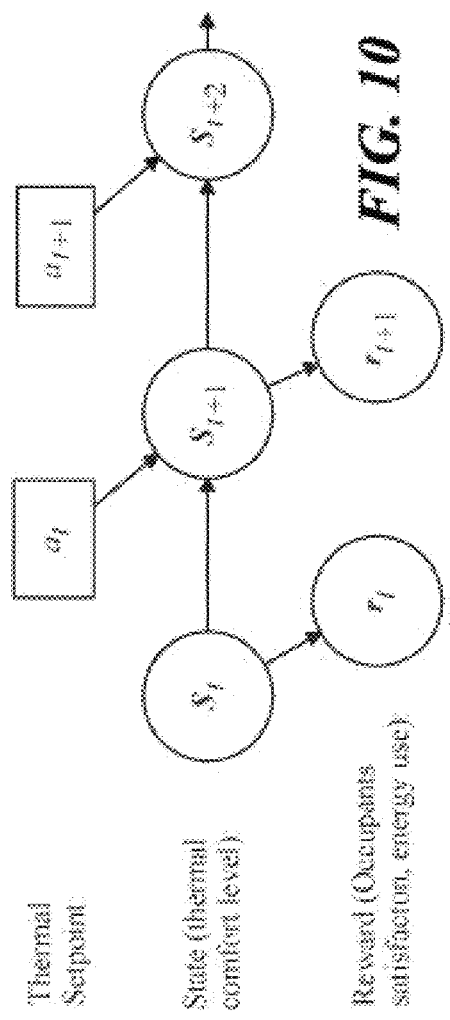
FIG. 10 is a diagrammatic representation of an embodiment of a thermal setpoint optimization process.

The step of controlling the HVAC of the built space 18 based in part or more upon the estimated thermal comfort can be carried out in different ways in different embodiments. In an embodiment, a thermal setpoint is determined with the use of a setpoint optimization algorithm for the built space 18. The setpoint optimization algorithm can employ what-is-known-as the Markov decision process (MDP). The MDP can take the time-varying characteristic of facial skin temperature into consideration in its decision-making process. FIG. 10 is a diagrammatic representation of the setpoint optimization process using the MDP. In general, the MDP is a sequential decision-making process to control a stochastic system based on the system's state at each decision time step. Unlike previously-known approaches, the MDP incorporates how an adjustment of a current thermal setpoint impacts the occupant(s)'s future thermal comfort, and the MDP dynamically decides the optimum setpoint based on both current and predicted future comfort levels.

To determine the thermal setpoints in this embodiment, the system state representing the thermal comfort level is defined. For a built space with a single occupant, as an example, the occupant's predicted thermal comfort preference (i.e., warmer, cooler, or neutral) is taken as the system state. For a built space with multiple occupants, on the other hand, the matter call be formulated using the partially observed Markov decision process, and defining the system state as a vector whose component is the portion of occupants in each thermal comfort preference category. Still referring to FIG. 10, in this example, with the three thermal comfort preference categories of warmer, cooler, and neutral, the system stare at time t, denoted by $S_t$, becomes the vector of percentages of occupants in warmer, cooler, and neutral states, i.e., $S_t$=[% warmer, % cooler, % neutral]. Further, in both single occupant and multi-occupant built spaces, the future system state ($S_{t+1}$) can be predicted based on the current state ($S_t$) and thermal setpoint ($a_t$) using the comfort prediction model set forth above.

Furthermore, the system state can be associated with its reward function, $r_t$. Multiple alternatives for quantifying the reward can be considered. In the multi-occupant built space, for example, the reward function could be the portion of comfortable occupants, i.e., % neutral. Another alternative is to assign different weights on each portion of thermal comfort preference and use the weighted sum—for example, greater weight can be given to neutral, followed by warmer, and then cooler during the winter season. Energy usage can also be incorporated into the reward function in order to minimize overuse of energy.

In this embodiment, at each decision time point, the thermal setpoint $a_t$ can be decided with the aim of maximizing the total reward during the remaining operational hours. Here, the setpoint Or can be decided based on maximizing the total thermal comfort levels during the whole-time interval so as to minimize the total thermal discomfort time. Specifically, in this example, at time t the optimum thermal setpoint $a_t$ can be found that can maximize $v_t(S_t,a_t)=\Sigma_c^T(r_t+\delta \cdot v_{t+1}(S_{t+1},a_{t+1}))$, where $v_t(S_t,a_t)$ represents the total rewards until the last decision epoch, T (e.g., end of office hours in a day) and $\delta_t$ (<1) is a discounting factor that accounts for prediction uncertainties in the future. In finding the optimum thermal setpoint $a_t$, a±1° C. temperature change from the previous setting can be considered as it is the minimum change that can be made each time, and it can avoid sharper temperature changes. But in some embodiments a larger temperature change (e.g., ±2° C. or more) may be suitable.

Further, in this embodiment, die optimum thermal setpoints can be found using backward dynamic programming or policy iteration procedure. At time t, the optimum thermal setpoint $a_t$ that minimizes $v_t(S_t,a_t)$ can be determined based on the current state $S_t$ and the predicted trajectory of future states. Then, at time t+1, with updated state information of $S_{t+1}$, the thermal setpoint $a_{t+1}$ can be adjusted to minimize $v_{t+1}(S_{t+1},a_{t+1})$. The process can continue until the last decision epoch, T. The decision interval, or lapse of time, between two consecutive decision epochs T may vary in different embodiments, in one embodiment, for instance, the decision interval can be 30 minutes, and in other embodiments the decision interval can be greater than or less than 30 minutes.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a thermal comfort estimation of at least one human occupant in a built space in real-time with the use of at least one thermographic camera and at least one red, green, and blue depth (RGB-D) sensor, the method comprising:
   providing the at least one thermographic camera at the built space, and providing the at least one RGB-D sensor at the built space;
   capturing thermal images of the at least one human occupant in the built space via the at least one thermographic camera, and capturing RGB-D images of the at least one human occupant in the built space via the at least one RGB-D sensor;
   extracting facial skin temperatures of the at least one human occupant using the captured thermal images and the captured RGB-D images, wherein extracting facial skin temperatures involves registering the captured thermal images and captured RGB-D images; and
   estimating the thermal comfort of the at least one human occupant in the built space using the extracted facial skin temperature of the at least one human occupant;
   wherein capturing thermal images of the at least one human occupant in the built space involves capturing the thermal images from various angles of the at least one human occupant relative to the at least one thermographic camera, and capturing RGB-D images of the at least one human occupant in the built space involves capturing the RGB-D images from various angles of the at least one human occupant relative to the at least one RGB-D sensor.

2. The method as set forth in claim 1, further comprising controlling heating, ventilation, and air conditioning (HVAC) of the built space based on the estimated thermal comfort of the at least one human occupant.

3. The method as set forth in claim 2, wherein controlling the HVAC of the built space involves determining a thermal setpoint of the built space based on the estimated thermal comfort of the at least one human occupant.

4. The method as set forth in claim 1, wherein providing the at least one thermographic camera at the built space involves providing multiple thermographic cameras at the built space, and providing the at least one RGB-D sensor at the built space involves providing multiple RGB-D sensors at the built space, and wherein capturing thermal images of the at least one human occupant in the built space involves capturing thermal images of multiple human occupants in the built space via the multiple thermographic cameras, and capturing RGB-D images of the at least one human occupant in the built space involves capturing RGB-D images of multiple occupants in the built space via the multiple RGB-D sensors.

5. The method as set forth in claim 1, wherein providing the at least one thermographic camera at the built space involves providing multiple thermographic cameras at the built space, and providing the at least one RGB-D sensor at the built space involves providing multiple RGB-D sensors at the built space, wherein capturing thermal images of the at least one human occupant involves capturing the thermal images of multiple human occupants via the multiple thermographic cameras, capturing RGB-D images of the at least one human occupant involves capturing the RGB-D images of the multiple human occupants via the multiple RGB-D sensors, and wherein the method further comprises registering the multiple human occupants among the multiple thermographic cameras and among the multiple RGB-D sensors.

6. The method as set forth in claim 1, wherein capturing thermal images of the at least one human occupant in the built space involves capturing the thermal images from various distances of the at least one human occupant relative to the at least one thermographic camera, and capturing RGB-D images of the at least one human occupant in the built space involves capturing the RGB-D images from various distances of the at least one human occupant relative to the at least one RGB-D sensor.

7. The method as set forth in claim 1, wherein extracting facial skin temperatures comprises detecting the presence of the at least one human occupant in the built space via the at least one RGB-D sensor.

8. The method as set forth in claim 1, wherein registering the captured thermal images and captured RGB-D images involves locating coordinates in the captured RGB-D images onto the captured thermal images.

9. The method as set forth in claim 1, wherein estimating the thermal comfort of the at least one human occupant in the built space involves estimating a warmer thermal comfort preference, a cooler thermal comfort preference, or a neutral thermal comfort preference.

10. The method as set forth in claim 1, wherein extracting facial skin temperatures comprises using distance data provided from the at least one RGB-D sensor with temperature data provided from the at least one thermographic camera.

11. The method as set forth in claim 2, wherein the built space is within a transportation vehicle.

12. A method of making a thermal comfort estimation of at least one human occupant in a built space in real-time with the use of at least one thermographic camera and at least one red, green, and blue depth (RGB-D) sensor, the method comprising:
capturing thermal images of the at least one human occupant in the built space via the at least one thermographic camera from various distances and various angles of the at least one human occupant relative to the at least one thermographic camera, and
capturing RGB-D images of the at least one human occupant in the built space via the at least one RGB-D sensor from various distances and various angles of the at least one human occupant relative to the at least one RGB-D sensor;
extracting facial skin temperatures of the at least one human occupant using the captured thermal images and the captured RGB-D images, distance data provided from the at least one RGB-D sensor is used with temperature data provided from the at least one thermographic camera; and
estimating the thermal comfort of the at least one human occupant in the built space using the extracted facial skin temperature of the at least one human occupant.

13. The method as set forth in claim 12, further comprising controlling heating, ventilation, and air conditioning (HVAC) of the built space based on the estimated thermal comfort of the at least one human occupant.

14. The method as set forth in claim 12, wherein capturing thermal images of the at least one human occupant in the built space involves capturing thermal images of multiple human occupants in the built space via multiple thermographic cameras, and capturing RGB-D images of the at least one human occupant in the built space involves capturing RGB-D images of multiple occupants in the built space via multiple RGB-D sensors.

15. The method as set forth in claim 12, wherein capturing thermal images of the at least one human occupant involves capturing the thermal images of multiple human occupants via multiple thermographic cameras, capturing RGB-D images of the at least one human occupant involves capturing the RGB-D images of the multiple human occupants via multiple RGB-D sensors, and wherein the method further comprises registering the multiple human occupants among the multiple thermographic cameras and among the multiple RGB-D sensors.

16. The method as set forth in claim 12, wherein extracting facial skin temperatures involves registering the captured thermal images and captured RGB-D images.

17. A method of making a thermal comfort estimation of at least one human occupant in a built space in real-time with the use of at least one thermographic camera and at least one red, green, and blue depth (RGB-D) sensor, the method comprising:
capturing thermal images of the at least one human occupant in the built space via the at least one thermographic camera, and capturing RGB-D images of the at least one human occupant in the built space via the at least one RGB-D sensor;
extracting facial skin temperatures of the at least one human occupant using the captured thermal images and the captured RGB-D images, wherein extracting facial skin temperatures involves locating coordinates in the captured RGB-D images onto the captured thermal images;
estimating the thermal comfort of the at least one human occupant in the built space using the extracted facial skin temperature of the at least one human occupant; and
controlling heating, ventilation, and air conditioning (HVAC) of the built space based on the estimated thermal comfort of the at least one human occupant;
wherein capturing thermal images of the at least one human occupant in the built space involves capturing the thermal images from various angles of the at least one human occupant relative to the at least one thermographic camera, and capturing RGB-D images of the at least one human occupant in the built space involves capturing the RGB-D images from various angles of the at least one human occupant relative to the at least one RGB-D sensor.

18. The method as set forth in claim 17, further comprising determining the total number of human occupants in the built space using the captured thermal images.

19. A non-transitory computer readable medium comprising a non-transient data storage device having stored thereon instructions that carry out the method of claim 12.

* * * * *